US008751760B2

United States Patent
Sauber et al.

(10) Patent No.: US 8,751,760 B2
(45) Date of Patent: Jun. 10, 2014

(54) SYSTEMS AND METHODS FOR POWER STATE TRANSITIONING IN AN INFORMATION HANDLING SYSTEM

(75) Inventors: William F. Sauber, Georgetown, TX (US); Gary Huber, Austin, TX (US); Richard Schuckle, Austin, TX (US); Thomas Pratt, Austin, TX (US)

(73) Assignee: Dell Products L.P., Round Rock, TX (US)

(*) Notice: Subject to any disclaimer, the term of this patent is extended or adjusted under 35 U.S.C. 154(b) by 662 days.

(21) Appl. No.: 12/572,057

(22) Filed: Oct. 1, 2009

(65) Prior Publication Data

US 2011/0082987 A1    Apr. 7, 2011

(51) Int. Cl.
G06F 12/16    (2006.01)
G06F 1/26    (2006.01)
G06F 11/14    (2006.01)
G06F 3/06    (2006.01)
G06F 1/32    (2006.01)
G06F 12/02    (2006.01)

(52) U.S. Cl.
CPC .......... *G06F 11/1451* (2013.01); *G06F 3/0679* (2013.01); *G06F 1/3203* (2013.01); *G06F 12/0238* (2013.01)
USPC .................. 711/162; 711/156; 711/E12.103; 711/103; 713/323

(58) Field of Classification Search
None
See application file for complete search history.

(56) References Cited

U.S. PATENT DOCUMENTS

| | | | |
|---|---|---|---|
| 5,230,055 A | 7/1993 | Katz et al. | |
| 5,450,003 A | 9/1995 | Cheon | |
| 5,465,367 A | 11/1995 | Reddy et al. | |
| 5,517,650 A | 5/1996 | Bland et al. | |
| 5,548,763 A | 8/1996 | Combs et al. | |
| 5,712,826 A | 1/1998 | Wong et al. | |
| 6,018,232 A | 1/2000 | Nelson et al. | |
| 6,145,068 A * | 11/2000 | Lewis | 711/170 |
| 6,209,088 B1 * | 3/2001 | Reneris | 713/1 |
| 6,240,032 B1 | 5/2001 | Fukumoto | |
| 6,311,282 B1 | 10/2001 | Nelson et al. | |
| 6,336,161 B1 * | 1/2002 | Watts | 711/103 |
| 6,363,501 B1 | 3/2002 | Tobias et al. | |
| 6,546,472 B2 * | 4/2003 | Atkinson et al. | 711/156 |
| 6,618,790 B1 | 9/2003 | Talreja et al. | |
| 6,782,484 B2 | 8/2004 | McGowan et al. | |
| 6,854,115 B1 | 2/2005 | Traversat et al. | |
| 6,928,586 B1 | 8/2005 | Tobias et al. | |
| 6,941,410 B1 | 9/2005 | Traversat et al. | |
| 6,954,879 B1 | 10/2005 | Tobias et al. | |
| 7,032,081 B1 | 4/2006 | Gefen et al. | |
| 7,613,749 B2 | 11/2009 | Flynn, Jr. et al. | |
| 2003/0070065 A1 | 4/2003 | Fleming | |
| 2010/0250833 A1* | 9/2010 | Trika | 711/103 |

* cited by examiner

Primary Examiner — Denise Tran
(74) Attorney, Agent, or Firm — Baker Botts L.L.P.

(57) ABSTRACT

Systems and methods for power state transitioning in an information handling system having a volatile memory and a nonvolatile memory are disclosed. Dirty data in the volatile memory may be identified. The dirty data may include data that has not been stored in the nonvolatile memory. Dirty data may be written from the volatile memory to the nonvolatile memory. Transitioning to a reduced power state may be in response to a trigger event. Transitioning from the reduced power state may be in response to a wake signal. Data may be copied from the nonvolatile memory to the volatile memory. An operating system may be waked to a restored state.

17 Claims, 4 Drawing Sheets

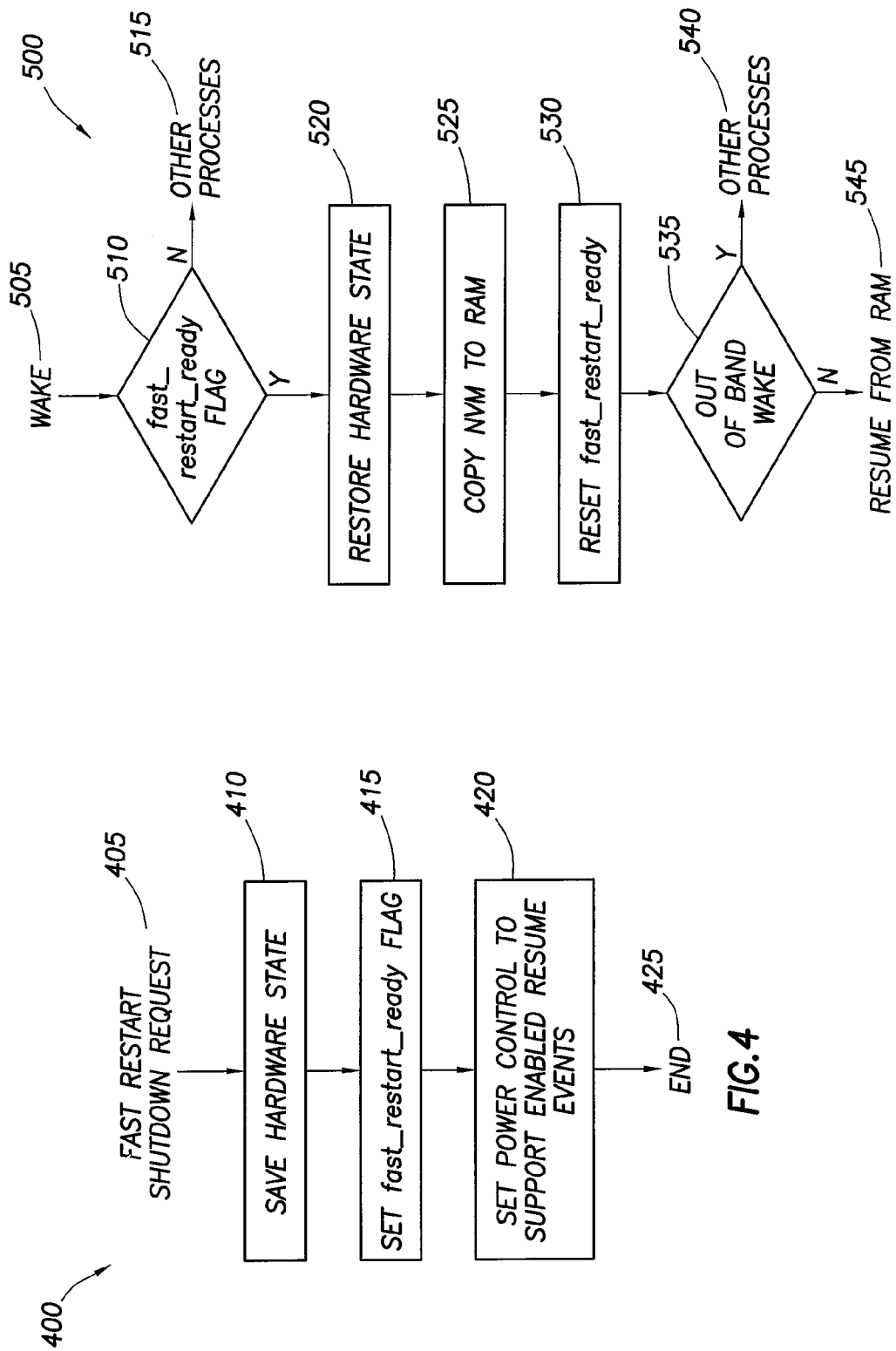

SYSTEMS AND METHODS FOR POWER STATE TRANSITIONING IN AN INFORMATION HANDLING SYSTEM

TECHNICAL FIELD

The present disclosure relates generally to information handling systems and, more particularly, to Systems And Methods For Power State Transitioning In An Information Handling System.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Examples of information handling systems, including computers such as workstations, desktop computers and portable computers, may typically have a technique for limiting the amount of power consumed by the systems. One technique may involve placing a system in one or more reduced power states. For example, a system may have standby, hibernate and shutdown processes for placing the system in corresponding reduced power states.

Standby may involve, e.g., saving data and instructions to memory, such as volatile memory, and transitioning to a low power state. However, as memory densities and system capacities increase with advances in information handling systems, it may become increasingly important to power down volatile memory due to increasing power requirements. One example of this may be the increasing power requirements associated with refresh requirements of DRAM (dynamic random access memory).

Hibernate may involve, e.g., storing data and instructions to disk and transitioning to a lower power state. However, having different low power states from which to select, such as standby, hibernate and shutdown, may be often be confusing to end users who may have difficulty determining which mode to use. In addition, resuming from standby to a normal operational mode may involve relatively fast processes—e.g., on the order of seconds—but resuming from hibernate to normal operation may be significantly slower by comparison. Although hibernate may consume much less power than standby, the time required to resume from hibernate may be undesirable.

SUMMARY

In one aspect, a method for power state transitioning in an information handling system having a volatile memory and a nonvolatile memory is disclosed. The method includes identifying dirty data in the volatile memory, wherein the dirty data includes data that has not been stored in the nonvolatile memory. The method further includes writing dirty data from the volatile memory to the nonvolatile memory. The method further includes transitioning to a reduced power state in response to a trigger event and transitioning from the reduced power state in response to a wake signal. The method further includes copying data from the nonvolatile memory to the volatile memory and waking an operating system to a restored state.

In another aspect, a computer program, stored in a tangible medium for power state transitioning in an information handling system having a volatile memory and a nonvolatile memory, is disclosed. The computer program includes executable instructions to cause at least one processor to: identify data in the volatile memory which has been modified or not previously stored in the nonvolatile memory; transfer modified or not previously stored data from the volatile memory to the nonvolatile memory; transition to a reduced power state in response to a trigger event; transition from the reduced power state in response to a wake signal; copy data from the nonvolatile memory to the volatile memory; and wake an operating system to a restored state.

In another aspect, an information handling system is disclosed. A processor is communicatively coupled to a volatile memory and a nonvolatile memory. A computer readable medium includes instructions that cause the at least one processor to: identify data in the volatile memory which has been modified or not previously stored in the nonvolatile memory; transfer modified or not previously stored data from the volatile memory to the nonvolatile memory; transition to a reduced power state in response to a trigger event; transition from the reduced power state in response to a wake signal; copy data from the nonvolatile memory to the volatile memory; and wake an operating system to a restored state.

Thus, the present disclosure provides apparatuses and methods for efficiently saving data and instructions, transitioning to one or more low power states including mechanical off, and resuming from a low power state to normal operation with increased speed. The present disclosure also enables elimination of the need to present a user with multiple 'off' options. Other technical advantages will be apparent to those of ordinary skill in the art in view of the specification, claims and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 is a process flow diagram illustrating a control transfer in accordance with certain embodiments of the present disclosure; and FIG. 5 is a process flow diagram illustrating a fast restart in accordance with certain embodiments of the present disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
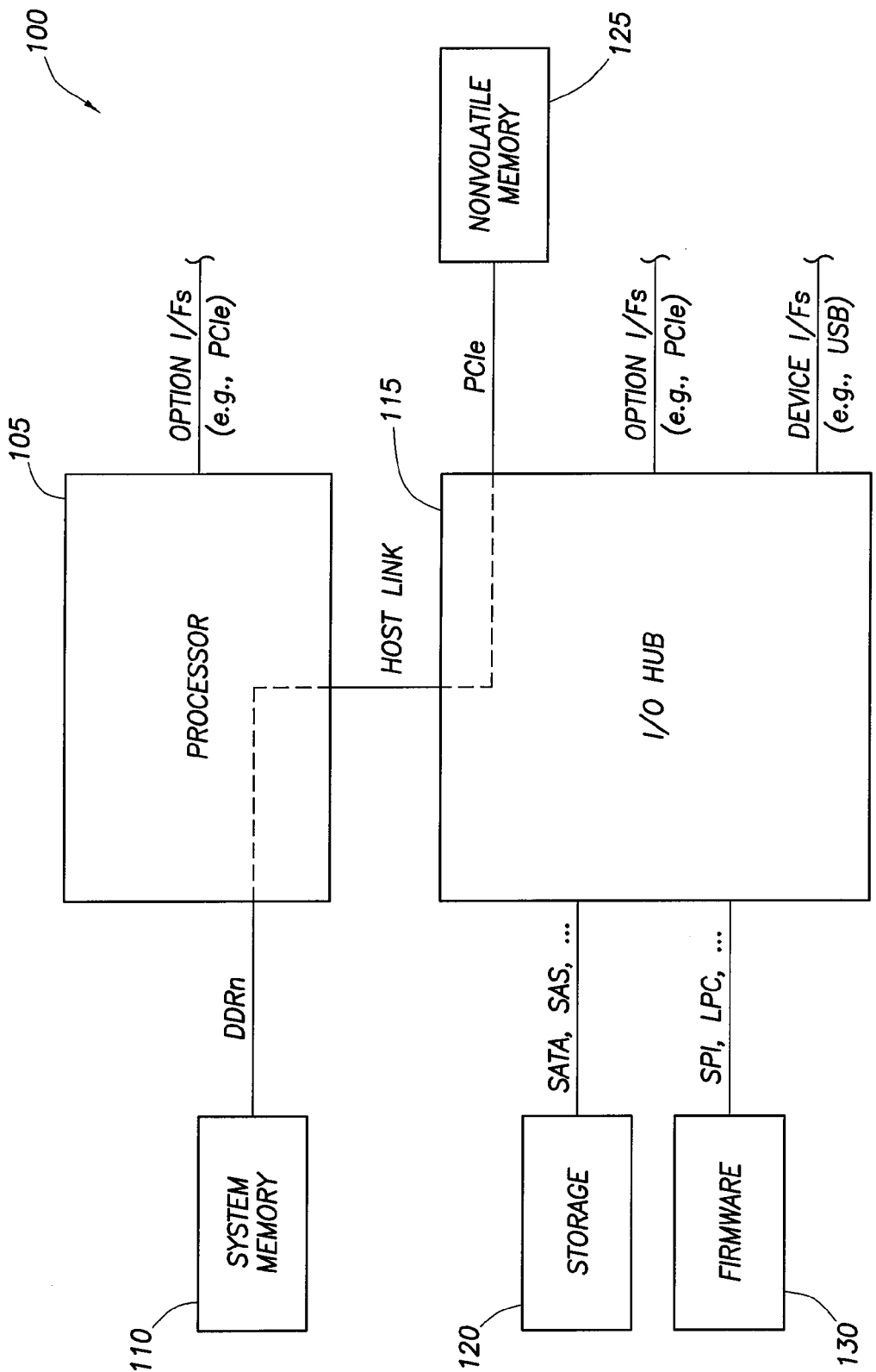
FIG. 1 is a block diagram showing an information handling system in accordance with certain embodiments of the present disclosure.

FIG. 1 illustrates a block diagram of an example information handling system 100, in accordance with certain embodiments of the present disclosure. In certain embodiments, information handling system 100 may be a personal computer (e.g., a desktop computer, workstation or portable computer). As depicted in FIG. 1, information handling system 100 may include a processor 105, a system memory 110 communicatively coupled to processor 105, an I/O hub 115 communicatively coupled to processor 105, storage 120 communicatively coupled to I/O hub 115, nonvolatile memory 125 communicatively coupled to I/O hub 115, and firmware 130 communicatively coupled to I/O hub 115.

Processor 105 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 105 may interpret and/or execute program instructions and/or process data stored in system memory 110, storage media 120 and/or another component of information handling system 100. Processor 105 may be coupled to other components (not shown) with optional interfaces (I/Fs) via a PCIe (Peripheral Component Interconnect Express) interface, for example.

System memory 110 may be communicatively coupled to processor 105, for example, via a DDRn (a version of a double-date-rate type) interface. System memory 110 may include any system, device, or apparatus configured to retain program instructions and/or data for a period of time (e.g., computer-readable media). System memory 110 may include random access memory (RAM), electrically erasable programmable read-only memory (EEPROM), a PCMCIA card, flash memory, magnetic storage, opto-magnetic storage, or any suitable selection and/or array of volatile memory. Note that apparatuses and methods described may apply to the volatile portions of system memory 110.

Processor 105 may be coupled to an I/O hub 115 via a host link, for example. I/O hub 115 may be communicatively coupled to storage 120 via, for example, a small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Storage 120 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

I/O hub 115 may be communicatively coupled to firmware 130 via any suitable interface such as SPI (System Packet Interface), LPC (Low Pin Count) interface, for example. The information handling system 100 may include one or more components that process and/or operate based on firmware embedded in or coupled to the component. For example, such components may include hard disk drives (HDDs), CD-ROM drives, and DVD drives, and/or various other devices and the like that include controllers driven by firmware. Firmware may be the program code embedded in a storage device and maintained within or coupled to the device. The firmware for a component most often comprises the operational code for the component.

More generally, firmware may include program code operable to control a plurality of information handling system 100 operations. System memory 110, for example, may store firmware such as a basic input/output system (BIOS) program, and/or device drivers such as network interface card (NIC) drivers. A device driver may include program code operable to facilitate interaction of a hardware device with other aspects of information handling system 100. A BIOS program may include software that facilitates interaction with and between the information handling system 100 devices such as a keyboard, a mouse, and/or one or more I/O devices. Information handling system 100 may operate by executing BIOS for a system firmware in response to being powered up or reset. BIOS may identify and initialize components of system 100 and cause an operating system to be booted.

I/O hub 115 may be communicatively coupled to nonvolatile memory 125 via a PCIe interface, for example. Nonvolatile memory 125 may include, for example, fast nonvolatile memory such as flash memory, NVDIMMs (nonvolatile dual in-line memory modules), a PCIe (Peripheral Component Interconnect Express) add-in-card, a direct connect nonvolatile interface (e.g., an ONFI (Open NAND Flash Interface Working Group) interface), a SSD (solid-state drive), or another storage type configured for fast restart. I/O hub 115 may be coupled to other components (not shown) with optional interfaces (I/Fs) such as a PCIe interface and device interfaces (I/Fs) such as a USB (Universal Serial Bus) interface, for example.

In certain embodiments, an operating system may maintain a copy or image of system memory 110 in fast nonvolatile memory 125. A page structure may be used to keep nonvolatile memory current. A page may be a block of memory that may be virtualized such that there may be physical pages, virtual pages and a mapping function between them. An operating system may map physical memory to virtual memory and, beyond that, the operating system may map physical memory to nonvolatile storage. A page table may be employed to store mapping between virtual memory and physical memory. A translation lookaside buffer (TLB) may be utilized in conjunction with one or more page tables and, for example, may store page table entries. An operating system may maintain a pool of available pages. Upon initiation of a system process, the operating system may allocate pages out of the available pool to that process.

In certain embodiments, all or some of the contents of system memory 110 may be transferred to nonvolatile storage 125 on an opportunistic and/or incremental basis. It is to be understood that transferring data on an opportunistic basis means transferring data during idle periods or other periods of low system usage or low system component usage. For example, contents of system memory 110 may be transferred opportunistically. Access to sets of data and/or instructions stored in pages may include reads and/or writes as, e.g., in the case of R/W (read/write) pages. An operating system may maintain a record of whether or not a page has been written to. A page in physical memory that has been written to may differ from its corresponding page in nonvolatile memory and accordingly be deemed a dirty page. Dirty data may be volatile memory that has been modified. R/W pages may be checked during process idle periods for dirty tags, i.e., addresses to physical memory locations associated with modified contents. After being identified, dirty pages may be stored to nonvolatile memory during idle or other low-usage periods.

As an alternative to opportunistic transfer, contents of memory may be transferred on an incremental basis. It is to be understood that transferring data on an incremental basis means transferring data regardless of whether idle periods or other periods of low system or component usage occur. For example, each time a page in physical memory has been written to, the contents of the page may be stored in nonvolatile memory regardless of whether a system idle condition exists. One of ordinary skill in the art having the benefit of this disclosure would understand that a number of variations may be employed to effect either or both incremental and opportunistic transfer.

In some embodiments, an operating system may incorporate wear leveling when storing pages. The operating system may attempt to distribute the pages substantially evenly in nonvolatile memory and, thereby, avoid a relatively high concentration of write cycles. In some embodiments, an operating system may communicate mapping to the firmware in a dedicated nonvolatile memory region. In some embodiments, an operating system may create mapping of the empty pages so that unallocated pages are not restored upon a resume process, thereby increasing the speed of the resume process.

Figure 2:
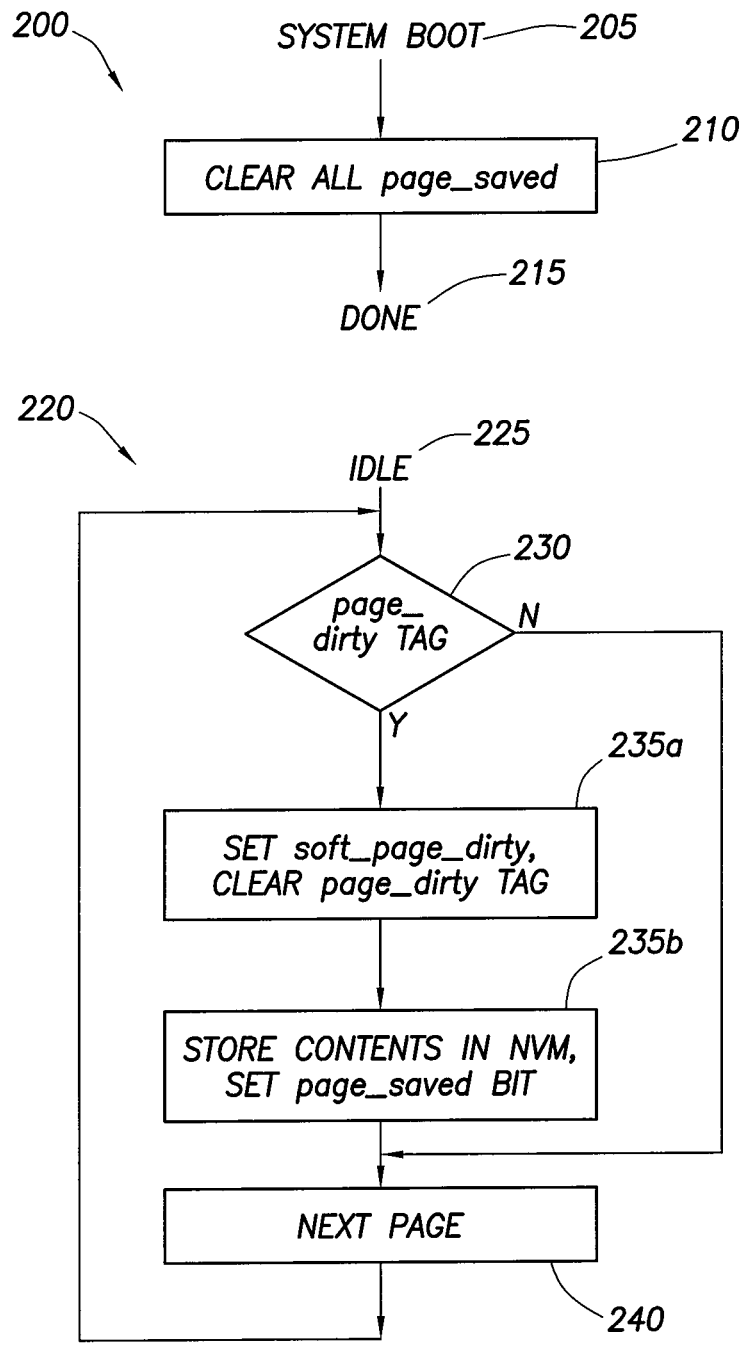
FIG. 2 is a process flow diagram illustrating an operating system maintaining an image of system memory in fast nonvolatile memory in accordance with certain embodiments of the present disclosure.

FIG. 2 shows a flow chart for one example of an operating system maintaining an image of system memory in fast nonvolatile memory. At initialization 200, the system is booted up in step 205. Immediately thereafter, all records indicating whether pages have been stored in nonvolatile memory may be initialized in step 210. For example, all page_saved bits may be cleared. In step 215, initialization 200 may be complete, and the system may then perform other operations.

Thereafter, process 220 may check and store page contents. At an idle period or other low-usage period, process 220 may begin at step 225. In step 230, it may be determined whether a given page is dirty, e.g., by checking a page_dirty tag associated with the page in the page table. If the page is dirty, then in step 235b the contents of the page may be stored in nonvolatile memory (NVM). A flag or other record may be updated to reflect that the current instance of the page has been stored. For example, a page_saved bit associated with the page may be set. The page_dirty tag must be reset (step 235a) to prepare for the possibility of another write. Also, an alternate copy of the tag may be recorded (step 235a) for standard OS usage of the tag. If the page is not dirty, step 235 may be skipped. Process 220 may continue to the next page in step 240 and repeat the process steps if the idle condition continues. As an alternative to determining which pages have been written to, process 220 may save pages on another basis, such as on random, prioritized, or sequential bases, during the idle period.

Figure 3:
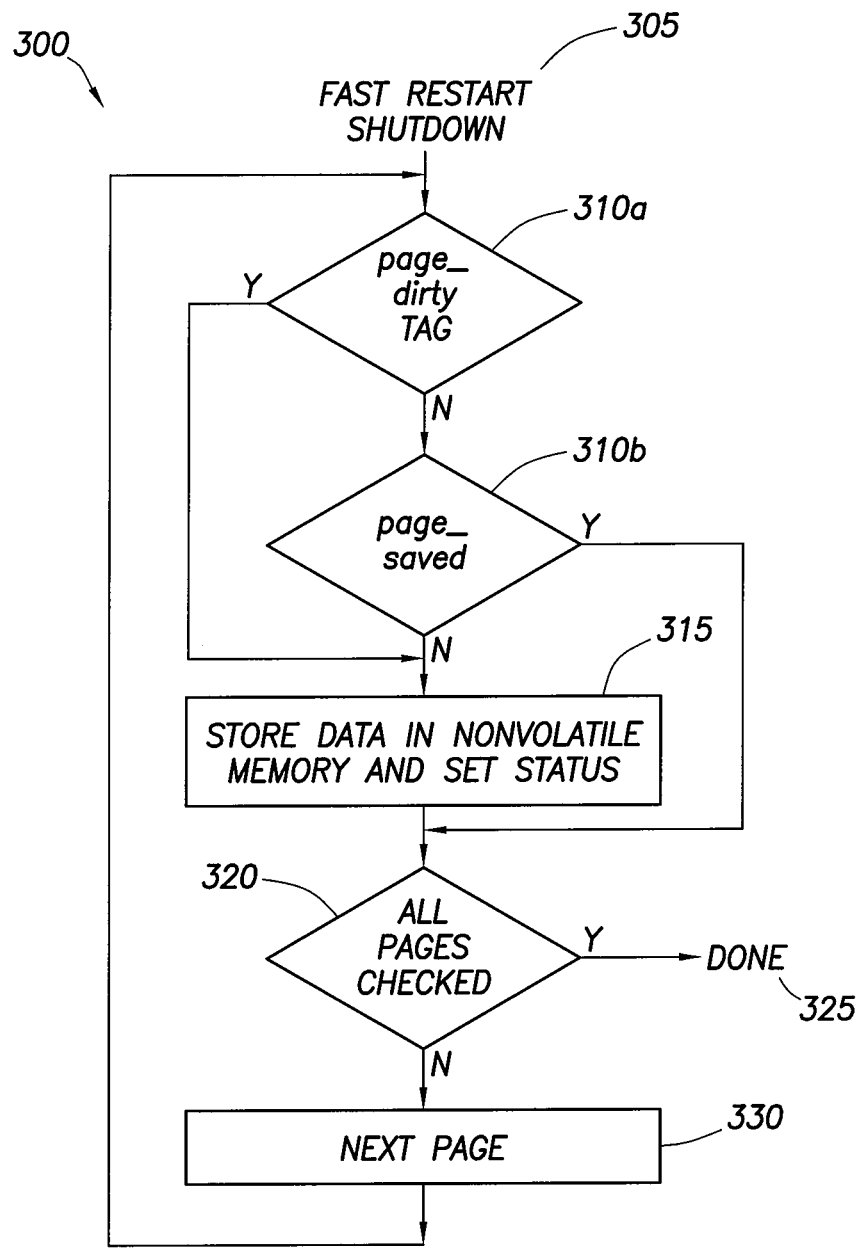
FIG. 3 is a process flow diagram illustrating shutdown storage process for fast restart in accordance with certain embodiments of the present disclosure.

FIG. 3 shows a flow chart for one example of a shutdown storage process 300 in support of a fast restart in accordance with certain embodiments of this disclosure. At step 305, fast shutdown may be initiated by one or more of a number of trigger events. One example is a single operating system "off" function that may replace or be offered in addition to standard standby, hibernate and shutdown options (or other multilevel low-power states) as user-visible options. Other examples may include a power button press, a laptop lid closure, a hot key, or a number of variations based on user preference and/or specific environments. Following the trigger event, all processes may be stopped in a manner similar to the current standby operation.

In steps 310a and 310b, it may be determined whether there is unsaved data. For example, page_saved bits and page_dirty tags or other flags/records may be checked to identify unsaved pages. Unsaved data may be stored in nonvolatile storage, and associated flags/records may be updated in step 315. In step 320, it may be determined if all pages have been checked. If all pages have not been checked, process 300 may continue to a next page at step 330 and loop to step 310. When all pages have been checked, process 300 may end at step 325. Following a shutdown storage process for fast restart such as process 300, preparation for fast restart shutdown may be complete. Control may be transferred to firmware.

FIG. 4 shows a flow chart for one example of control transfer 400 in accordance with certain embodiments of this disclosure. Control may be transferred from an operating system (OS) to firmware following a fast restart shutdown command. Control transfer 400 may be initiated by a fast restart shutdown request in step 405 when an operating system has prepared for a restart from nonvolatile memory. In step 410, one or more hardware states may be saved. System firmware may store any additional data needed for further power reduction. For example, to enable a lower power state, additional information such as current PCIe configuration space may need to be saved in certain configurations.

As would be understood by one of ordinary skill in the art having the benefit of this disclosure, any number of variations may be made to maintain power to certain system components and/or to prepare certain system components for any of a number of wake events, as desired. For example, it may be desirable for a configuration with access to a general purpose register to transfer the register information to fast nonvolatile memory. In other cases, it may be desirable to maintain power to the register. Also for example, whether and what information needs to be saved may depend on core logic power well requirements of a particular configuration, as would be understood by of ordinary skill in the art having the benefit of this disclosure.

In step 415, a flag or other record may be updated to reflect that the system has been prepared for a fast restart. For example, a fast_restart_ready flag may be set in firmware. In some environments, it may be desirable to allow for one or more wake events in step 420. Power control may be set to support resume events, for example, to allow wake on LAN and/or other wake events. Process 400 may end at step 425 with the system entering a reduced power state.

FIG. 5 shows a flow chart for one example of fast restart 500 in accordance with certain embodiments of this disclosure. In step 505, any of a number of wake events occurs. For example, a wake event may be user-initiated. In step 510, a flag or other record—e.g., the fast_restart_ready flag—may be checked to determine whether the system has been prepared for a fast restart. If the system has not been prepared for a fast restart, fast restart 500 ends in step 515, and the system may be configured to proceed with another process such as a fresh boot, as desired. If the system has been prepared for a fast restart, one or more of the hardware states that were stored in control transfer 400 may be restored to previous states, as needed, in step 520. At that point, the operating system may not be active and may not be able to restore its state. In step 525, contents of nonvolatile memory (NVM) may be copied to system memory, which, for example but not by way of limitation, may be DRAM. Copying contents of the nonvolatile memory back to the system memory may enable the operating system to return to a previous state. In some embodiments, firmware may recreate tables, such as multi-processor tables, PCI enumeration tables, and/or other tables, as in a full reboot or resume. In other embodiments, firmware may have saved some of the tables the first time they are created into nonvolatile memory rather than recreating the tables on a fast restart. In step 530, a flag or other record, such as the fast_restart_ready flag, may be reset.

Fast restart 500 may additionally include, in certain embodiments, determining whether or not certain wake events require control to be returned to the operating system, depending on the whether the system is capable of operating without waking the operating system. In some embodiments, it may be determined at step 535 whether an out of band wake condition requires fast restart 500 to end at step 540 and transition to out of band system management, for example. Absent such a condition, fast restart 500 continues to step 545, where firmware wakes the operating system to a restored state and transfers control to the operating system.

In certain embodiments, compression may be used to increase process speed and minimize nonvolatile memory requirements. For example, compressed data may be stored in nonvolatile memory, and another medium such as the hard drive may be used for overflow. Upon restart, certain pages may be retrieved from the hard drive rather than nonvolatile memory.

In certain embodiments, a map (e.g., a bit per page to indicate the presence of information) of occupied physical pages may be maintained by the OS and passed to the firmware. This map would be saved in nonvolatile memory and used to reduce the amount of date transferred during fast restart.

Thus, the present disclosure provides apparatuses and methods for efficiently saving data and instructions, transitioning to one or more low power states including mechanical off, and resuming from a low power state to normal operation with increased speed. The present disclosure may also enable elimination of the need to present a user with multiple 'off' options. Other technical advantages will be apparent to those of ordinary skill in the art in view of the specification, claims and drawings.

Although the present disclosure has been described in detail, it should be understood that various changes, substitutions, and alterations can be made hereto without departing from the spirit and the scope of the invention as defined by the appended claims. Various changes, substitutions, and alterations can be made to interfaces with multiple devices at one end and a single device at the other end without departing from the spirit and the scope of the invention.

What is claimed is:

1. A method for power state transitioning in an information handling system having a volatile memory and a nonvolatile memory, the method comprising:
    identifying dirty data in the volatile memory, wherein the dirty data comprises data that has not been stored in the nonvolatile memory, wherein identifying dirty data comprises checking a flag within the volatile memory during process idle periods;
    writing dirty data from the volatile memory to the nonvolatile memory, wherein writing dirty data is at least partially performed on an opportunistic basis, based, at least in part, on a usage level of a component within the information handling system;
    transitioning to a reduced power state in response to a trigger event;
    transitioning from the reduced power state in response to a wake signal;
    copying data from the nonvolatile memory to the volatile memory;
    updating a record to reflect that a current instance of the dirty data has been stored;
    recording an alternate copy of the flag for standard operating system usage of the flag;
    resetting the flag; and
    waking an operating system to a restored state.

2. The method of claim 1, wherein the writing dirty data is performed on an incremental basis.

3. The method of claim 1, wherein:
    the transitioning to the reduced power state includes saving data associated with one or more hardware states to the nonvolatile memory; and the transitioning from the reduced power state includes restoring the one or more hardware states based, at least in part, on the data associated with the one or more hardware states.

4. The method of claim 1, further comprising:
transferring control of the transitioning to firmware.

5. The method of claim 1, wherein the nonvolatile memory is a flash memory.

6. The method of claim 1, wherein the nonvolatile memory is an SSD.

7. A computer program, stored in a tangible, non-transitory computer readable medium for power state transitioning in an information handling system having a volatile memory and a nonvolatile memory, comprising executable instructions to cause at least one processor to:
identify data in the volatile memory which has been modified or not previously stored in the nonvolatile memory, wherein identifying dirty data comprises checking a flag within the volatile memory during process idle periods;
transfer modified or not previously stored data from the volatile memory to the nonvolatile memory at least partially on an opportunistic basis, based, at least in part, on a usage level of a component within the information handling system;
transition to a reduced power state in response to a trigger event;
transition from the reduced power state in response to a wake signal;
copy data from the nonvolatile memory to the volatile memory;
update a record to reflect that a current instance of the dirty data has been stored;
record an alternate copy of the flag for standard operating system usage of the flag;
reset the flag; and
wake an operating system to a restored state.

8. The computer program of claim 7, wherein the computer program further comprises executable instructions to cause the at least one processor to:
transfer modified or not previously stored data from the volatile memory to the nonvolatile memory on an incremental basis.

9. The computer program of claim 7, wherein:
the transitioning to the reduced power state comprises saving data associated with one or more hardware states to the nonvolatile memory; and
the transitioning from the reduced power state comprises restoring the one or more hardware states based, at least in part, on the data associated with the one or more hardware states.

10. The computer program of claim 7, wherein the computer program further comprises executable instructions to cause the at least one processor to:
transfer control of the transitioning to firmware.

11. The computer program of claim 7, wherein the nonvolatile memory is a flash memory.

12. The computer program of claim 7, wherein the nonvolatile memory is an SSD.

13. An information handling system, comprising:
a processor communicatively coupled to a volatile memory and a nonvolatile memory;
a computer readable medium comprising instructions that cause the at least one processor to:
identify data in the volatile memory which has been modified or not previously stored in the nonvolatile memory, wherein identifying dirty data comprises checking a flag within the volatile memory during process idle periods;
transfer modified or not previously stored data from the volatile memory to the nonvolatile memory at least partially on an opportunistic basis, based, at least in part, on a usage level of a component within the information handling system;
transition to a reduced power state in response to a trigger event;
transition from the reduced power state in response to a wake signal;
copy data from the nonvolatile memory to the volatile memory;
update a record to reflect that a current instance of the dirty data has been stored;
record an alternate copy of the flag for standard operating system usage of the flag;
reset the flag; and
wake an operating system to a restored state.

14. The information handling system of claim 13, where the instructions further cause the at least one processor to:
transfer modified or not previously stored data from the volatile memory to the nonvolatile memory on an incremental basis.

15. The information handling system of claim 13, wherein:
the transitioning to the reduced power state comprises saving data associated with one or more hardware states to the nonvolatile memory; and
the transitioning from the reduced power state comprises restoring the one or more hardware states based, at least in part, on the data associated with the one or more hardware states.

16. The information handling system of claim 15, wherein the instructions further cause the at least one processor to:
transfer control of the transitioning to firmware.

17. The information handling system of claim 13, wherein the nonvolatile memory is an SSD.

* * * * *